United States Patent
Lo et al.

(10) Patent No.: US 7,821,288 B1
(45) Date of Patent: Oct. 26, 2010

(54) CIRCUIT PROTECTING APPARATUS AND ASSOCIATED METHOD, AND CIRCUIT PROTECTING LAYER

(75) Inventors: Chen-Hsing Lo, Hsinchu Hsien (TW); Chien-Pang Lu, Hsinchu Hsien (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 12/481,645

(22) Filed: Jun. 10, 2009

(30) Foreign Application Priority Data

Apr. 28, 2009 (TW) .................. 98114062 A

(51) Int. Cl.
*H03K 19/00* (2006.01)
(52) U.S. Cl. .................. 326/8; 326/115; 716/9; 726/26
(58) Field of Classification Search .......... 326/8, 326/101, 115; 713/189, 194; 716/9, 10, 716/12; 726/26
See application file for complete search history.

(56) References Cited

U.S. PATENT DOCUMENTS

2010/0122229 A1* 5/2010 Lo et al. .................. 716/10

* cited by examiner

*Primary Examiner*—Daniel D Chang
(74) *Attorney, Agent, or Firm*—WPAT, PC; Justin King

(57) ABSTRACT

A circuit protecting apparatus is provided. The circuit protecting apparatus comprises a selecting module, a routing module, a processing module, and a controlling module. The selecting module selects for each of a plurality of a minimum-sized routing region a routing pattern from a plurality of predetermined routing patterns, and generates an input signal. The routing module then generates the routing comprising the selected routing patterns on a to-be-protected region to form a circuit protecting layer. The routing receives the input signal and outputs an output signal. The processing module decodes the output signal into a restored signal a compares the restored signal with the input signal to generate a comparison result, according to which the controlling module selectively fails a chip.

16 Claims, 9 Drawing Sheets

CIRCUIT PROTECTING APPARATUS AND ASSOCIATED METHOD, AND CIRCUIT PROTECTING LAYER

CROSS REFERENCE TO RELATED PATENT APPLICATION

This patent application is based on a Taiwan, R.O.C. patent application No. 098114062 filed on Apr. 28, 2009.

FIELD OF THE INVENTION

The present invention relates to circuit protection, and more particularly, to a circuit protecting apparatus and an associated method, and a circuit protecting layer for preventing a region on a chip to be protected from being cracked by crackers.

BACKGROUND OF THE INVENTION

Accompanied with continual development of the electronic technology, various electronic products are becoming more and more versatile with overwhelmingly diversified functions. Therefore, innovated circuit designs of chips are also becoming more and more complicated in order to meet user requirements of the electronic products.

However, as techniques of reverse engineering of chip circuit layout advance, important circuit layout designs of many chips are exposed to crackers with improper intentions. For example, a cracker may first remove the epoxy encapsulating a chip using nitrate acid, cleanse the chip using acetone, deionized water or isopropyl alcohol, and then further etch away the various layers of metal. After removing the encapsulation of the chip, provided with enough knowledge on the routing of signals within the chip, the cracker is able to obtain information for reconstructing the structure of the chip through the focused ion beam (FIB) technique, or even connect signals that the cracker is interested in to the chip for further observation. As a result, certain crucial circuit layout designs in the chip may be cracked by ones with improper intentions, and may even by applied to illegitimate uses—this not only greatly jeopardizes rights of the owner of the circuit layout designs, but also seriously violates the relevant legislation that protects these circuit designs.

Therefore, it is an objective of the invention to provide a circuit protecting apparatus and an associated method, and a circuit protecting layer to overcome of foregoing issue.

SUMMARY OF THE INVENTION

According to a first embodiment of the invention, a circuit protecting apparatus is disclosed. The circuit protecting apparatus is applied to a to-be-protected region of a chip, by forming a circuit protecting layer on the to-be-protected region, which comprises a plurality of minimum-sized routing regions. The circuit protecting apparatus comprises a selecting module, a routing module, a processing module and a control module. The routing module is coupled to the selecting module and the circuit protecting layer. The processing module is coupled to the selecting module and the circuit protecting layer. The control module is coupled to the processing module.

In this embodiment, the selecting module selects a routing pattern from a plurality predetermined routing patterns for each of the minimum-sized routing regions. The routing module generates a routing on the to-be-protected region using the selected routing patterns to form the circuit protecting layer. The routing is coupled to a plurality of repeaters and the selecting module.

In practice, the minimum-sized routing regions are obtained by successively dividing the to-be-protected region using prime factorization. Each time the to-be-protected region is divided into smaller regions after factorization, a routing starting point and an ending point of each smaller region are determined. Therefore, when the to-be-protected region is divided into the plurality of minimum-sized routing regions, the routing starting point and the ending point of each minimum-sized routing region are also determined.

The selecting module, according to the routing starting point and the routing ending point of each minimum-sized routing region, randomly selects a routing pattern for each of the minimum-sized routing regions among all routing patterns having the same routing starting point and routing ending point from a plurality of predetermined routing patterns stored in a database. The routing module then generates the routing on the to-be-protected region using the selected routing patterns. When the routing module completes the random routing process of all the minimum-sized routing regions in sequence, the circuit protecting layer is formed on the to-be-protected region.

The routing, coupled to the plurality of repeaters, receives an input signal and generates an output signal. In practice, the intensity of the input signal may attenuate due to wire transmission loss after being inputted into the routing. The routing is thus provided with a repeater at every predetermined length internal to prevent attenuation of the input signal by repeating the input signal.

Upon receiving the output signal from the routing, the processing module decodes the output signal into a restored signal, and compares the restored signal with the input signal to generate a comparison result. According to the comparison result, the control module selectively fails the chip.

For example, when the comparison result indicates that the restored signal is different from the input signal, it means that circuit protecting layer is likely undergoing a cracking procedure or destruction, hence the control module immediately fails the chip. Whereby, the circuit protecting apparatus effectively prevents the to-be-protected region of the circuit from being cracked or destroyed.

According to a second embodiment of the invention, a circuit protecting method applied to a to-be-protected region of a chip is disclosed. First, the to-be-protected region is divided into a plurality of minimum-sized routing regions, followed by selecting from a plurality of predetermined routing patterns a routing pattern for each of the minimum-sized routing regions. Using the selected routing patterns, a routing is generated on the to-be-protected region to form a circuit protecting layer. In practice, when the routing receives an input signal and generates an output signal, the output signal is decoded into a restored signal. The restored signal is compared with the input signal to selectively fail the chip.

According to a third embodiment of the invention, a circuit protecting layer formed on a to-be-protected region of a circuit in chip by a circuit protecting apparatus is disclosed. The circuit protecting layer comprises a routing comprising a plurality of predetermined routing patterns. In this embodiment, a routing starting point and a routing ending point of the routing are located at edges of each routing pattern. The routing is coupled to a plurality of repeaters. In practice, the routing receives an input signal from the circuit protecting apparatus and, by passing the input signal through the repeaters, generates an output signal. When the circuit protecting apparatus receives the output signal, the output signal is decoded into a restored signal. The circuit protecting apparatus the compares the restored signal with the input signal to selectively fail the chip.

As described, according to the circuit protecting apparatus and the associated method, a circuit protecting layer is formed by a routing comprising a plurality of random and complicated routing patterns on a to-be-protected region of a chip, and the number the routing and complexity are increased using the repeaters, so that reverse engineering of the circuit layout of the chip using FIB is made unlikely feasible.

Further, once the circuit protecting apparatus detects that the output signal outputted from the circuit protecting layer is different from the input signal inputted into the circuit protecting layer, it implies that the circuit protecting layer is being cracked or destroyed. To protect the to-be-protected region below the circuit protecting layer, the circuit protecting apparatus immediately fails the chip to prevent the to-be-protected region from being cracked or destroyed.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

It is an objective of the invention to provide a circuit protecting apparatus and an associated method, and a circuit protecting layer, whereby a to-be-protected region of a circuit in a chip is protected against cracking and destruction to prevent crucial circuit layout designs from being used by improper intentions.

According to a first embodiment of the invention, a circuit protecting apparatus is disclosed. The circuit protecting apparatus is applied to a to-be-protected region of a circuit in a chip to form a circuit protecting layer on the to-be-protected region. Wherein, the to-be-protected region comprises a plurality of minimum-sized routing regions. In practice, the number of the circuit protecting layer formed on the to-be-protected region may be one or several, and the minimum-sized routing regions may be obtained by successively dividing the to-be-protected region through prime factorization; however, the invention is not limited thereto.

Figure 1A:
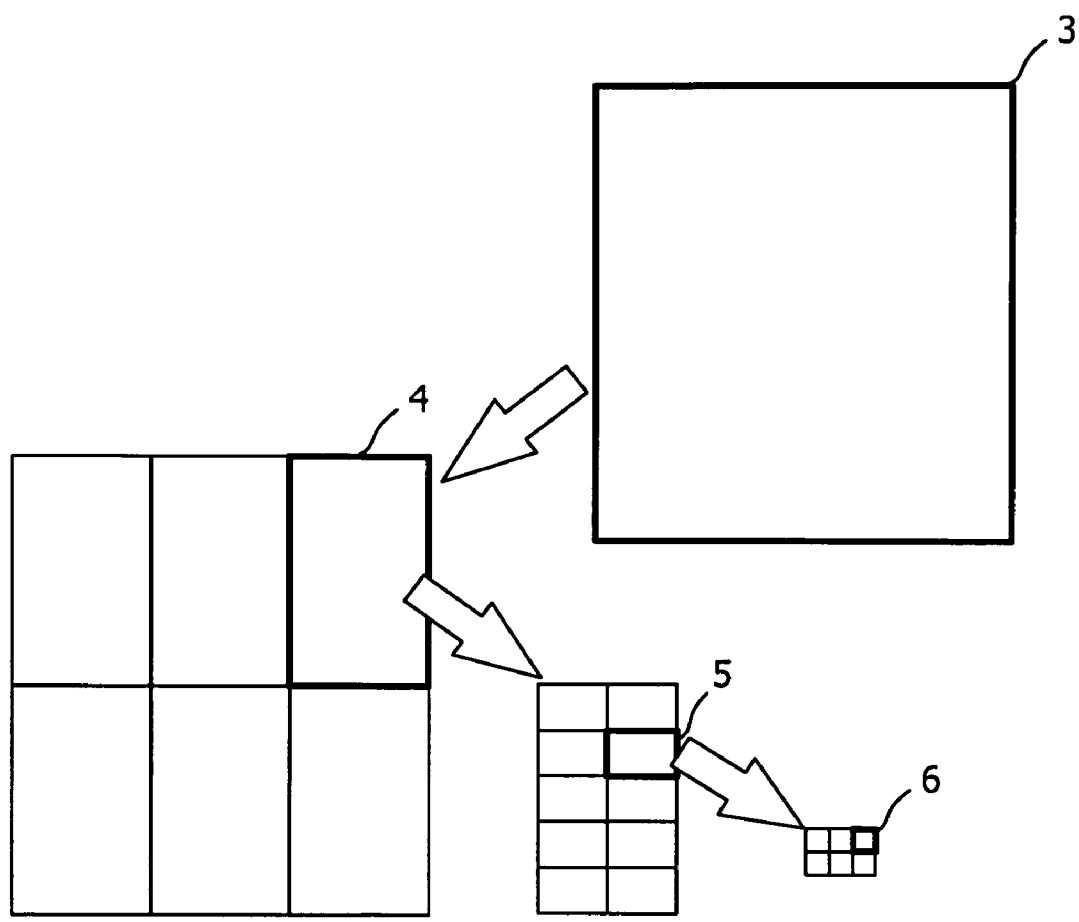
FIG. 1A is an example of successively dividing an area of a to-be-protected region into minimum-sized routing regions using prime factorization.
Figure 1B:
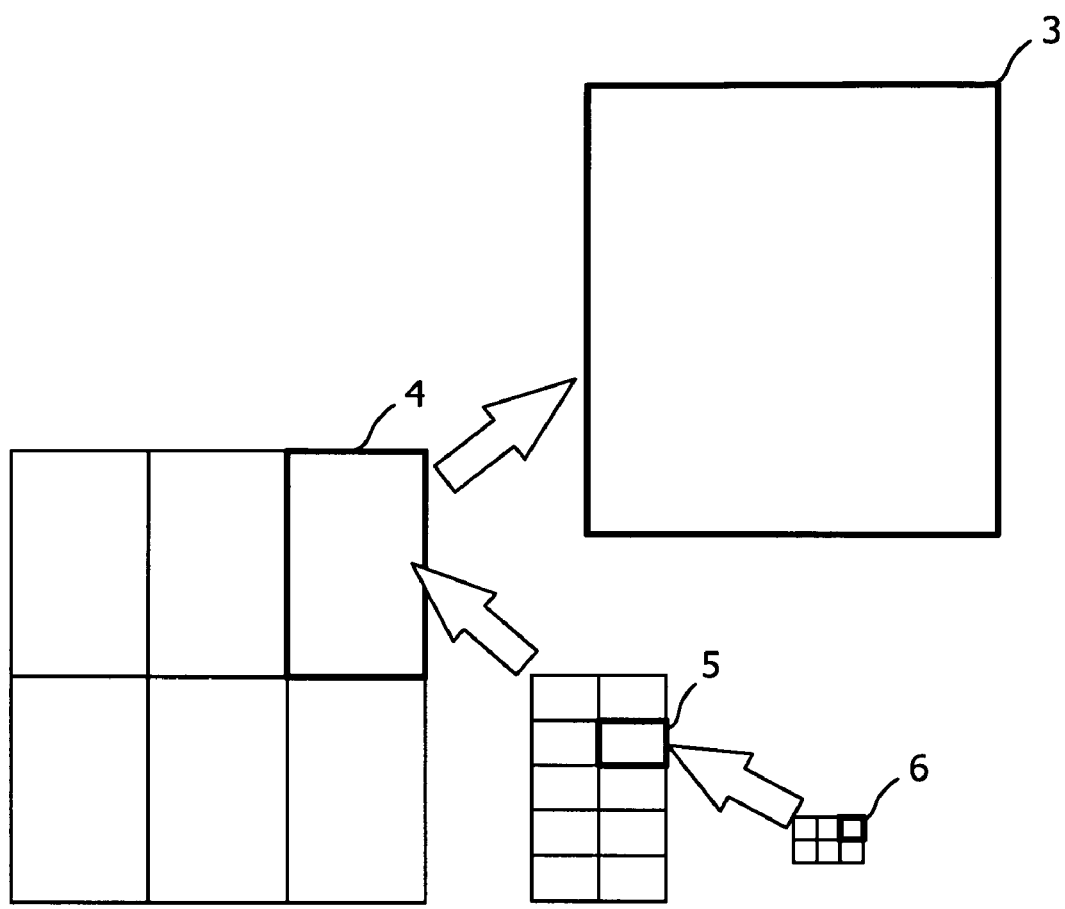
FIG. 1B is an example of a reverse sequence of the process in FIG. 1A, for randomly selecting a corresponding routing pattern for each of the minimum-sized routing regions to complete a routing procedure of an entire to-be-protected region.

Refer to FIGS. 1A and 1B. FIG. 1A is an example of successively dividing an area of the to-be-protected region into minimum-sized routing regions through prime factorization. FIG. 1B is an example of a reverse sequence of the process in FIG. 1A, for randomly selecting a corresponding routing pattern for each of the minimum-sized routing regions. When a routing procedure of the entire to-be-protected region is completed, the circuit protecting layer corresponding to the to-be-protected region is formed.

As shown in FIG. 1A, supposing an area A of a to-be-protected region 3, after a first prime factorization, is divided into six (2×3) sub-regions 4, each of which having an area of (⅙)A. Note that a routing starting point and a routing ending point of each sub-region 4 are determined when the to-be-protected region 3 is divided into the six sub-regions 4.

Each sub-region 4 then undergoes a second prime factorization to be divided into ten (5×2) small regions 5. That is to say, the to-be-protected region is divided into 60 small regions, each of which having an area of (1/60)A. Similarly, a routing starting point and a routing ending point of each small region 5 are determined.

Next, each small region 5 undergoes a third prime factorization to be divided into six (2×3) smaller regions, which are minimum-sized routing regions 6 of the to-be-protected region 3. At this point, the to-be-protected region 3 is divided into 360 minimum-sized routing regions 6. Similarly, a routing starting point and a routing ending point of each minimum-sized routing region 6 are determined.

When the to-be-protected region 3 is divided into 360 minimum-sized routing regions 6, and the routing starting point and the routing ending point 6 of each minimum-sized routing region 6 are determined, a random routing procedure reverse to the process in FIG. 1A is performed for all the minimum-sized routing regions 6, as shown in FIG. 1B.

In this embodiment, the routing starting point and the routing ending point of each minimum-sized routing region 6 are determined, and a database is stored with a plurality of predetermined routing patterns. Therefore, among all routing patterns that have the same routing starting and ending points as a particular minimum-sized routing region, a routing pattern is randomly selected to form a minimum-sized routing consisted of the selected routing pattern on the minimum-sized routing region.

For example, when the minimum-sized routings of the six minimum-sized routing regions 6 in FIG. 1B are finished, the random routing procedure of a small region 5 is completed; when small routings of the ten small regions 5 are finished, the random routing procedure of a sub-region 4 is completed. Similarly, when sub-region routings of the six sub-regions 4 are finished, the random routing procedure of the to-be-protected region 3 is completed; that is, the circuit protecting layer corresponding to the to-be-protected region 3 is formed on the to-be-protected region 3.

Figure 2:
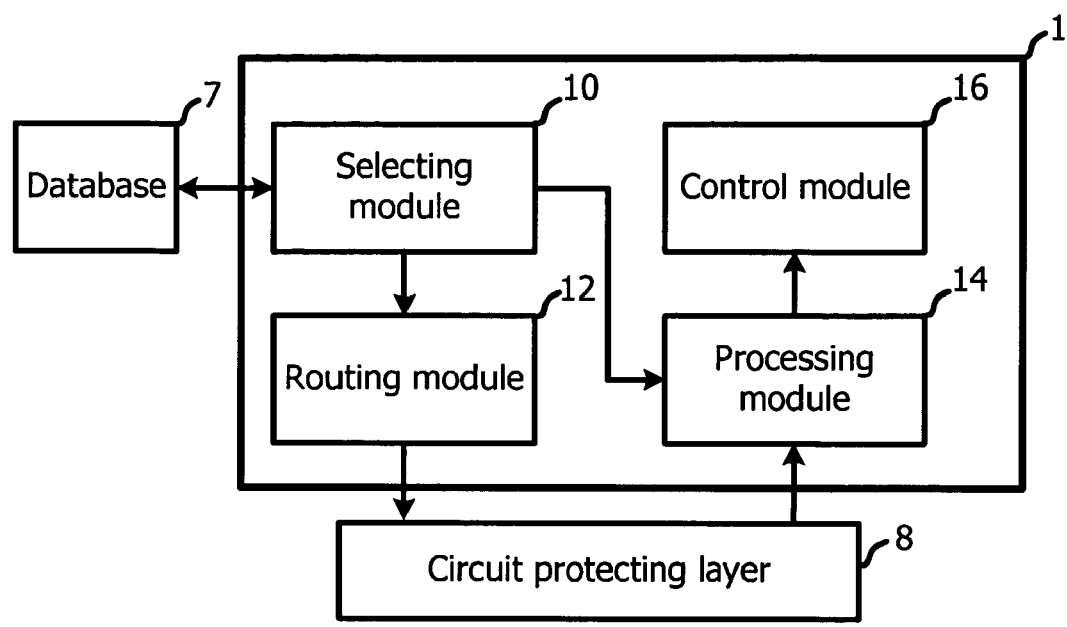
FIG. 2 is a functional block diagram of a circuit protecting apparatus according to a first embodiment of the invention.

Referring to FIG. 2, the circuit protecting apparatus of the invention shall be illustrated in conjunction with the functional block diagram as shown. A circuit protecting apparatus 1 comprises a selecting module 10, a routing module 12, a processing module 14 and a control module 16. The routing module 12 is coupled to the selecting module 10 and a circuit protecting layer 8. The processing module 14 is also coupled to the selecting module 10 and the circuit protecting layer 8. The control module 16 is coupled to the control module 14. The selecting module 10 is also connected to a database 7. Detailed description of the various modules of the circuit protecting apparatus 1 shall be given below.

In this embodiment, the circuit protecting apparatus 1 forms a circuit protecting layer 8 on the to-be-protected region. The circuit protecting layer 8 comprises a dense, complicated and randomly formed routing. To complete the routing, the selecting module 10 first selects a routing pattern from a plurality of predetermined routing patterns for each of the minimum-sized routing regions. In practice, the predetermined routing patterns are stored in the database 7. From the database 7 stored with the predetermined routing patterns, the selecting module 10 randomly selects a corresponding routing pattern from all the predetermined routing patterns that have same routing starting and ending points as the minimum-sized routing regions, respectively.

In practice, the routing may be consisted of a plurality routing patterns according to a routing rule, and the routing patterns correspond to the minimum-sized routing regions. Further, the routing starting and ending points of each routing pattern are located at edges of the routing pattern, and the routing starting and ending points of the overall routing formed at the circuit protecting layer 8 are also located edges of the overall routing.

Figure 3A:
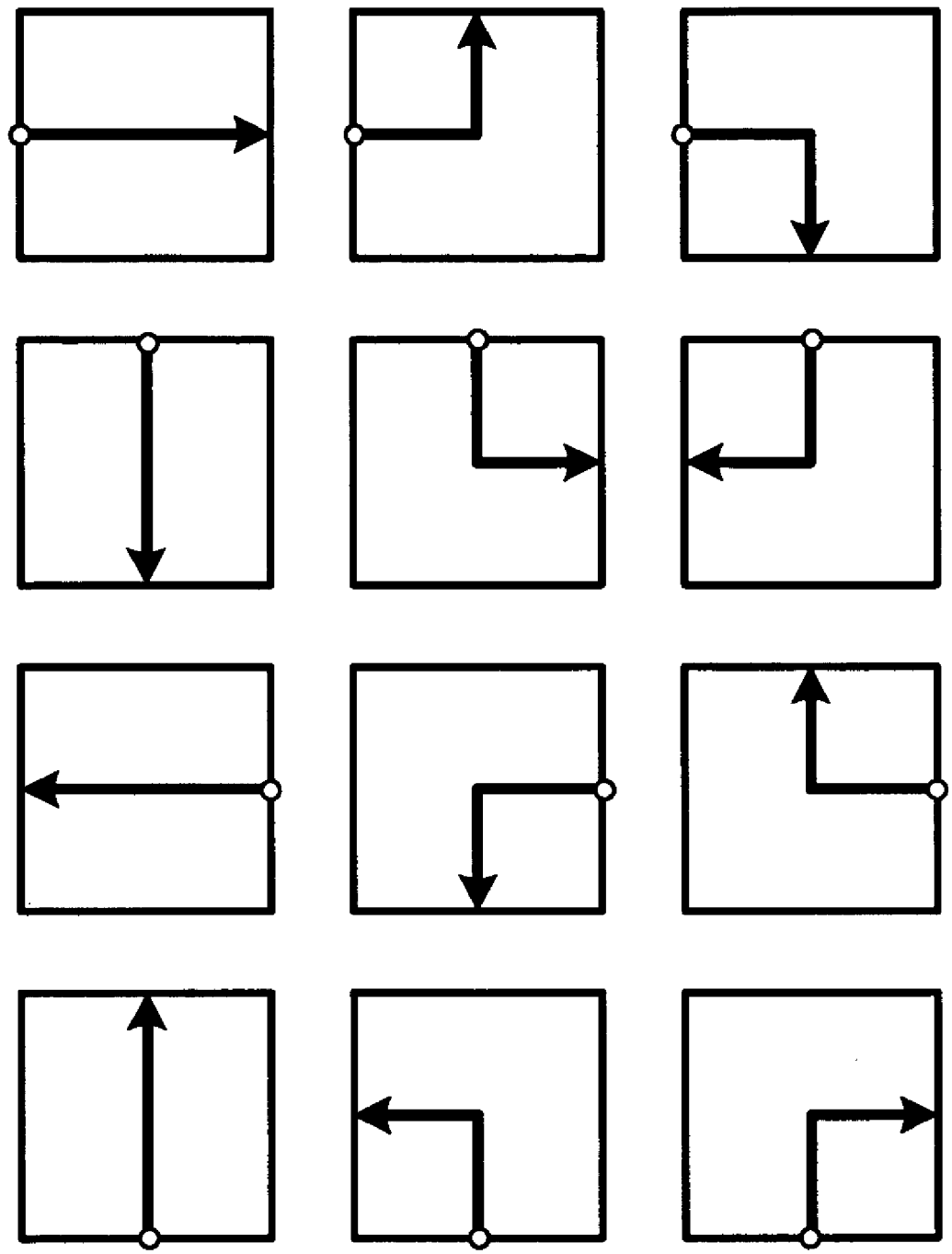
FIG. 3A is a schematic diagram of a routing pattern in a 1×1 model stored in a database.
Figure 3B:
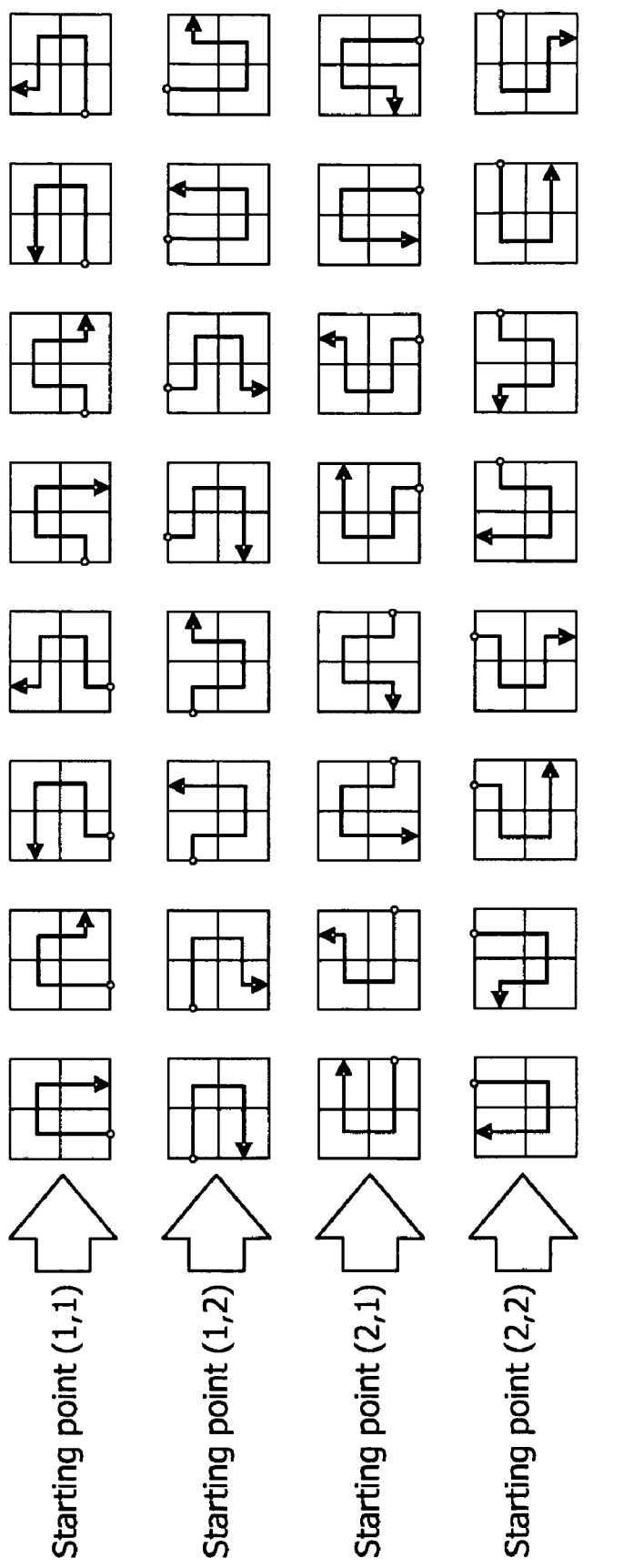
FIG. 3B is a schematic diagram of a routing pattern in a 2×2 model stored in the database.
Figure 3C:
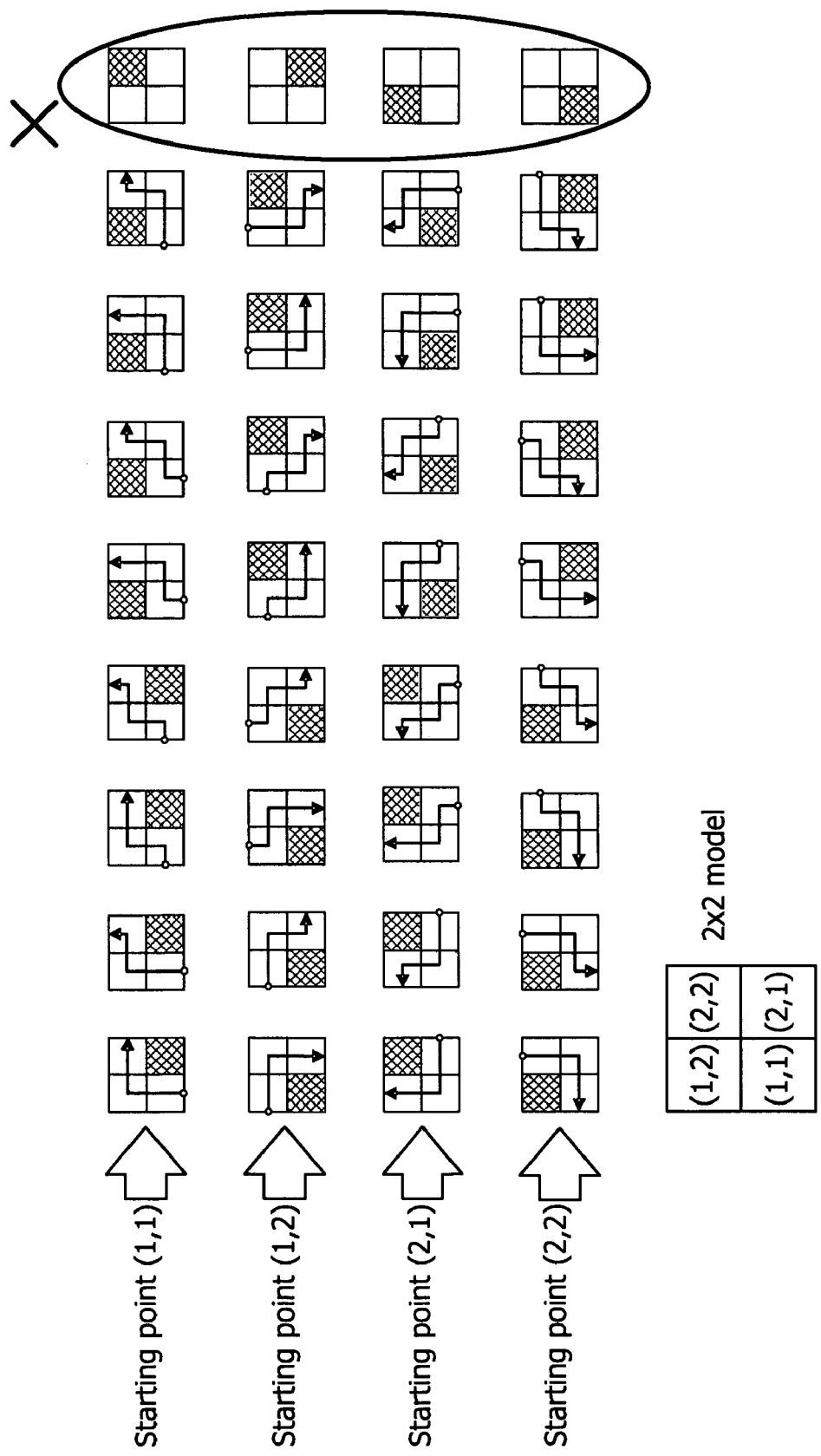
FIG. 3C is a schematic diagram of a routing pattern in a 2×2 model stored in a database, with the 2×2 pattern however including a section that cannot be routed.

Refer to FIGS. 3A to 3C. FIG. 3A shows a schematic diagram of a routing pattern in a 1×1 model stored in the database 7. For example, supposing the routing starting point is at the left side and the routing ending point is at the right side of the minimum-sized routing region, the selecting module 10 correspondingly selects the routing pattern at the top-left in FIG. 3A. Supposing the routing starting point is at the bottom side and the routing ending point is at the right side of the minimum-sized routing region, the selecting module 10 correspondingly selects the routing pattern at the bottom-right in FIG. 3A, and so on.

FIG. 3B is a schematic diagram of a routing pattern in a 2×2 model stored in the database 7. For example, supposing the routing starting point of a particularly minimum-sized routing region is at (1,1) of the minimum-sized routing region. For that it is necessary that the minimum-sized routing passes through all four sections of (1,1), (1,2), (2,1) and (2,2), the routing ending point of the minimum-sized routing region can only be at (1,2) or (2,1) but not at (2,2). Hence, there are eight possible routing patterns as shown in the first row in FIG. 3B. Supposing the routing starting point of the minimum-sized routing region is at the left side of (1,1) and the routing ending point of the minimum-sized routing region is at the top side (1,2), the selecting module 10 correspondingly selects the last routing pattern in the first row as the routing pattern of the minimum-sized routing region. Other routing patterns are selected similarly.

FIG. 3C shows a schematic diagram of a routing pattern in a 2×2 model stored in the database 7, with the 2×2 pattern however including a section that cannot be routed, due to a via in the section, for example. In FIG. 3C, the last pattern marked with an X of each row is an impossible case. Taking the first row for example, supposing the routing starting point of the minimum-sized routing region is at (1,1), it is infeasible that the section (2,2) at the opposite angle is an region that cannot be routed since that the minimum-sized routing must go through all three routable regions without repeat.

For example, supposing the routing starting point of a particular 2×2 minimum-sized routing region is at (1,1), the eight routing patterns in the first row in FIG. 3C are the eight possibilities from which the selecting module 10 selects as the routing pattern. Also supposing that the section that cannot be routed is at (2,1), the routing starting point of the minimum-sized routing region is at the bottom side of the section (1,1) and the routing ending point is at the right side of the section (2,2), the selecting module 10 correspondingly selects the first routing pattern to the left of the first row for the 2×2 minimum-sized routing region.

In another example, supposing the routing starting point of a particular 2×2 minimum-sized routing region is at (2,2), the eight routing patterns at the fourth row in FIG. 3C are the eight possibilities from which the selecting module 10 selects as the routing pattern. Also supposing that the section that cannot be routed is at (1,2), the routing starting point is at the top side of the section (2,2) and the routing ending point is at the left side of the section (1,1), the selecting module 10 correspondingly selects the first routing pattern to the left of the fourth row as the routing pattern for the 2×2 minimum-sized routing region. Other routing patterns are selected similarly.

It is to be noted that, the foregoing division results through prime factorization and routing patterns are used for illustrative purposes only. In practice, division results and routing patterns may have various modified versions. For example, a routing pattern may be a rectangle, a square, a shape as shown in FIG. 3C in which slanted lines represent position of vias, or other shapes. The size of the minimum-sized routing regions may also be dependent on actual requirements, as also encompassed by the scope of the invention.

When the routing patterns are selected by the selecting module 10, the routing module 12 forms a circuit protecting layer from the routing comprising the selected routing patterns. In practice, the routing, coupled to a plurality of repeaters and the selecting module 10, receives an input signal that passes through the repeaters to generate an output signal.

Due to a great length of the routing, the intensity of the input signal is likely to attenuate from wire transmission loss after the input signal is inputted into the routing. Therefore, at every predetermined length interval, the routing is coupled to a repeater that repeats the input signal to prevent the intensity attenuation.

The repeaters, apart from repeating the input signal, serve another important function of increasing the number of the routing lines to add complexity to the overall routing. After passing through the repeaters, a total number of lines in the routing may be multiplied. For example, suppose the number of lines in the routing formed according to the selected routing patterns is 8, the number is multiplied from 8 to 80 when the repeaters increase the number of lines by 10 times. Accordingly, the routing for forming the circuit protecting layer becomes even more complicated to increase the barrier of being cracked.

Figure 4:
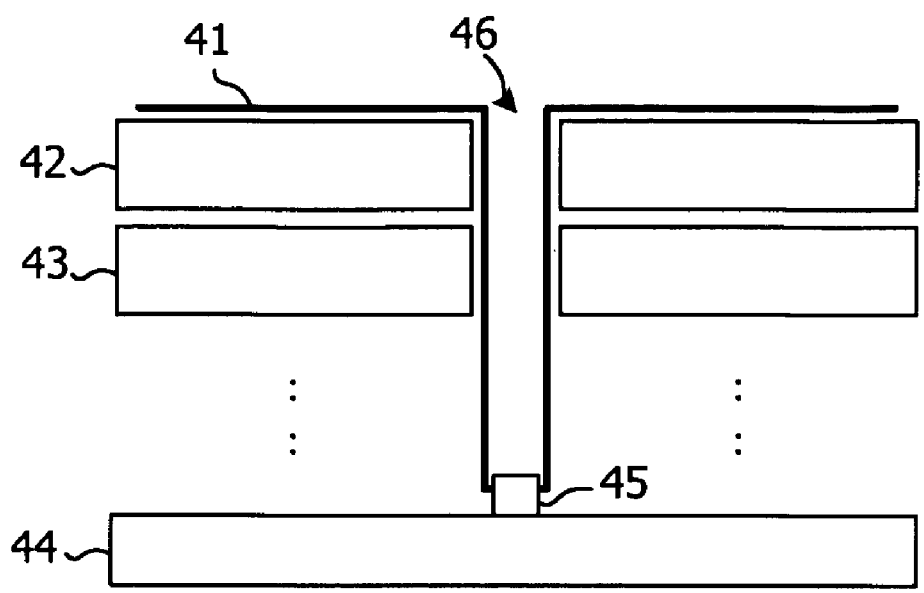
FIG. 4 is a schematic diagram of the routing at the circuit protecting layer coupling to a repeater at a cell layer.

Although the repeaters are coupled to the routing, they are provided at a cell layer below the circuit protecting layer but not at the circuit protecting layer. For example, referring to FIG. 4, a routing at the circuit protecting layer 42 extends to a cell layer 44 through a via 46 and coupled to a repeater 45 and then returns to the circuit protecting layer 42 through the via 46 to complete the routing 41. This special method is also aimed at increasing obstacles against cracking. Even if a cracker successfully reaches the circuit protecting layer with the aid of FIB, since the routing at the circuit protecting layer at several points extends to the lower cell layer, it is highly unlikely that the cracker cracks such complicated routing mechanism.

In practice, the repeaters may be buffers, inverters, XNOR logic gates, and XOR logic gates, but not limited thereto. Further, to again expand the difficulties in cracking the routing, fake repeaters that do not provide repeating functions may be included among the repeaters.

Next, the processing module 14 receives the output signal from the routing and receives the input signal from the selecting module 10. For that the output signal is a result of the input signal having passed through the repeaters, the processing module 14 first decodes the output signal into a restored signal, and compares the restored signal with the input signal to generate a comparison result.

According to the comparison result, the control module 16 selectively fails the chip. When the comparison result from the processing module 14 indicates that the restored signal is the same as the input signal, it means that the routing at the circuit protecting layer is not being cracked. The control module 16 then determines that chip is secure to maintain normal operations of the chip.

On the contrary, when the comparison result indicates that the restored signal is different form the input signal, it implies that the routing at the circuit protecting layer is being cracked or destroyed. The control module 16 then immediately fails the chip to prevent the to-be-protected region below the circuit protecting layer from being cracked or destroyed.

Figure 5:
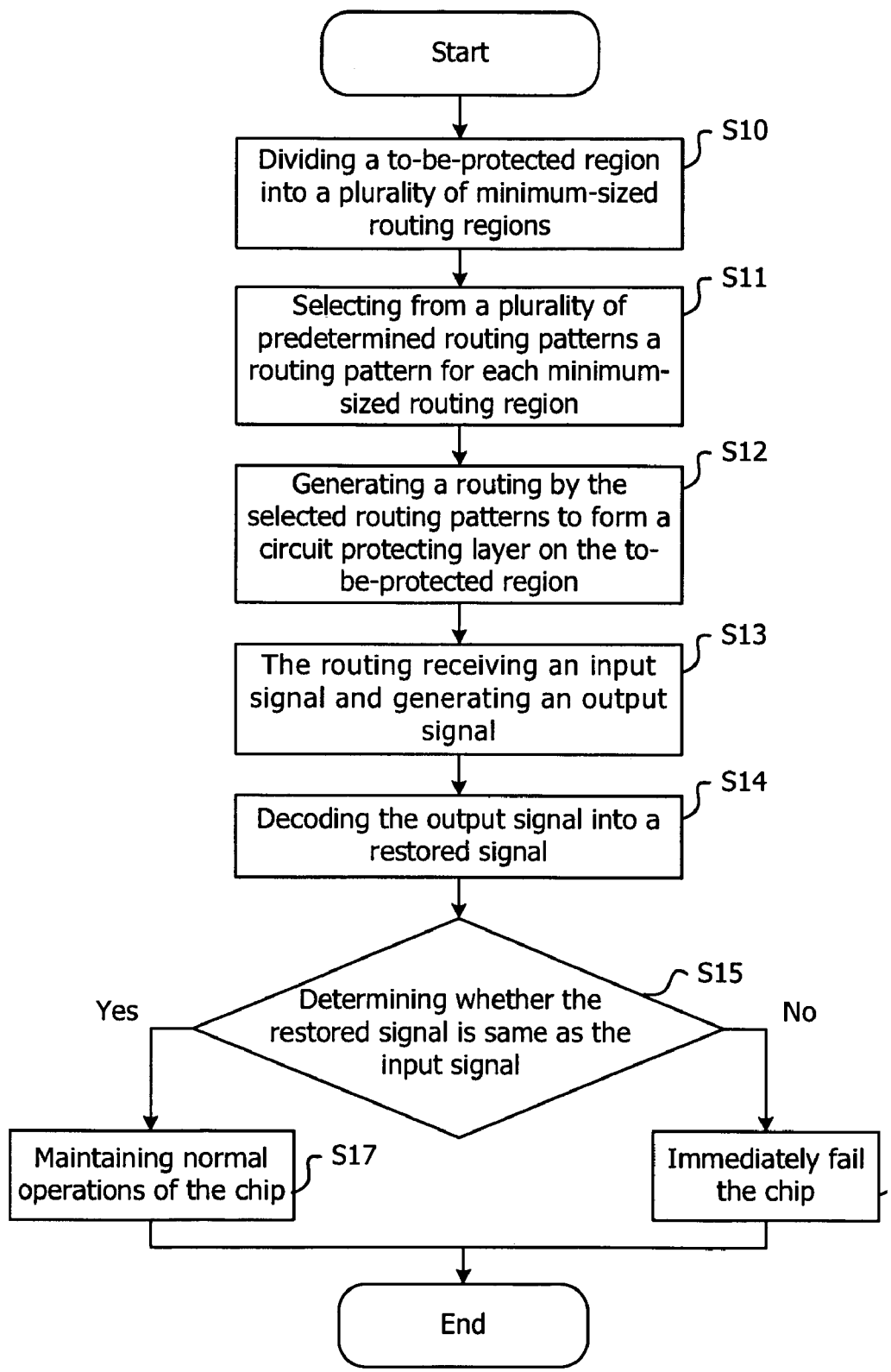
FIG. 5 is a flowchart of a circuit protecting method according to a second embodiment of the invention.

According to a second embodiment of the invention, a circuit protecting method is disclosed. The circuit protecting method forms a circuit protecting layer on a to-be-protected region of a circuit in a chip to protect the to-be-protected region. Refer to FIG. 5 showing a flowchart of the circuit protecting method.

As shown, the method starts with Step S10 to divide the to-be-protected region into a plurality of minimum-sized routing regions. For example, the minimum-sized routing regions are obtained by successively dividing an area of the to-be-protected region using prime factorization. The process of successively dividing the area of the to-be-protected region using prime factorization is as described with reference to FIG. 1, and shall be omitted here for brevity.

In Step S11, a routing pattern is selected for each of the minimum-sized routing regions from a plurality of predetermined routing patterns. For example, the routing is formed by the selected routing patterns according to a routing rule, wherein the selected routing patterns correspond to the minimum-sized routing regions, respectively. That is, since the to-be-protected region is divided into the minimum-sized routing regions, the corresponding routing patterns are selected from a database and arranged in sequence to complete the routing procedure.

In Step S12, a routing is generated on the to-be-protected region from the selected routing patterns to form the circuit protecting layer. In Step S13, the routing receives an input signal and generates an output signal. Note that a routing starting point and a routing ending point of the routing are determined to locate at edges of the routing patterns. Further, due to a great length of the routing, the intensity of the input signal is likely to attenuate from wire transmission loss after the input signal is inputted into the routing. Therefore, at every predetermined length interval, the routing is coupled to a repeater that repeats the input signal to prevent the intensity attenuation.

The repeaters, apart from repeating the input signal, serve another important function of increasing the number of the routing lines to add complexity to the overall routing. Although the repeaters are coupled to the routing, they are provided at a cell layer below the circuit protecting layer but not at the circuit protecting layer. For example, the routing at the circuit protecting layer extends to a cell layer through a via and coupled to a repeater and returns to the circuit protecting layer through the via to complete the routing. This special method is also aimed at increasing obstacles against cracking. Even if a cracker successfully reaches the circuit protecting layer with the aid of FIB, since the routing at the circuit protecting layer at several points extends to the lower cell layer, it is highly unlikely that the cracker cracks such complicated routing mechanism.

For that the output signal is a result of the input signal having passed through the repeaters, the output signal is decoded into a restored signal as in Step S14, following by Step S15 to determine whether the restored signal is the same as the input signal.

When the result from Step S15 is negative, that is, the restored signal is different from the input signal, it implies that the circuit protecting layer is being cracked or destroyed. Step S16 is then performed to immediately fail the chip to prevent the to-be-protected region from being cracked or destroyed.

Conversely, when the result from Step S15 is affirmative, that is, the restored signal is the same as the input signal, it means that the chip is in a secure state. Step S17 is performed to maintain normal operations of the chip.

Figure 6:
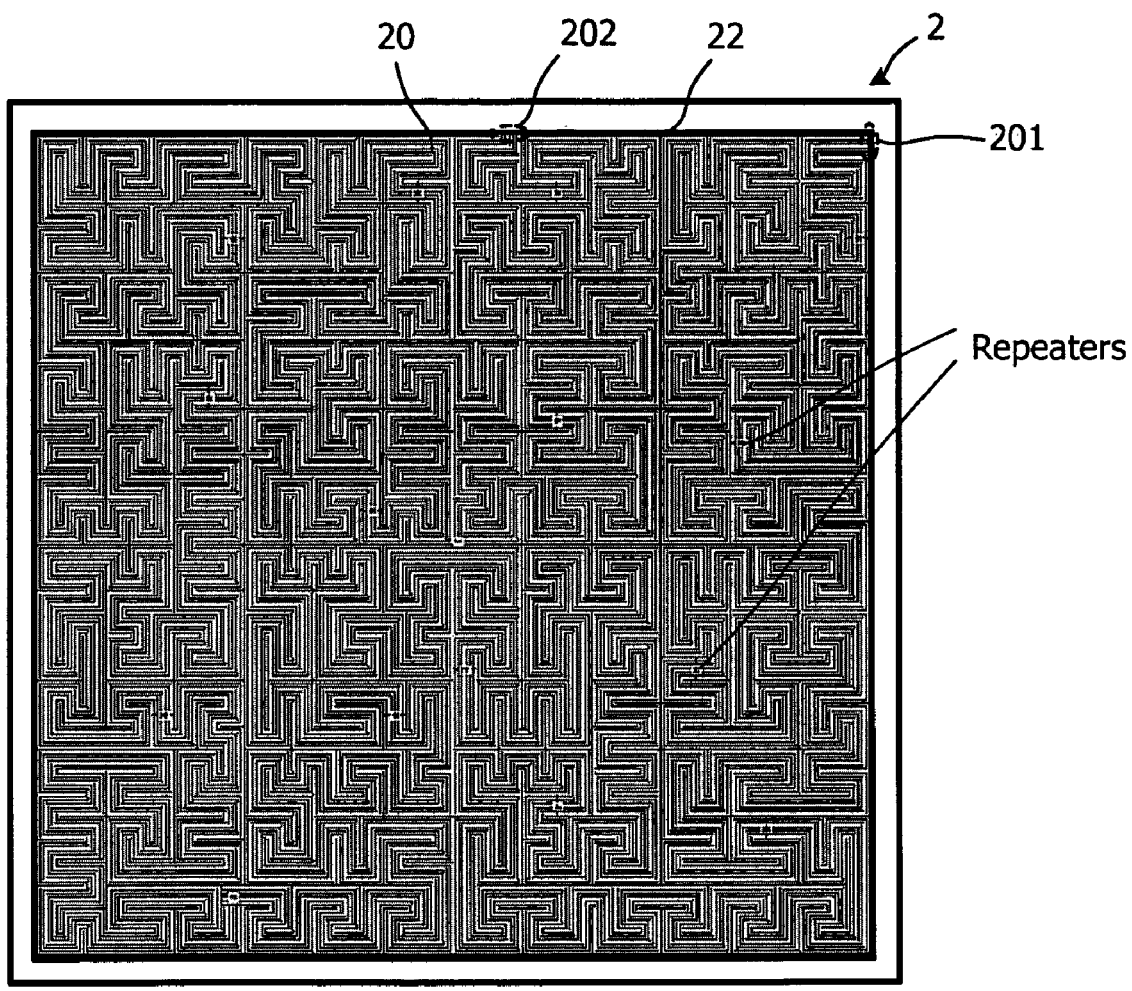
FIG. 6 is a schematic diagram of a circuit protecting layer according to a third embodiment of the invention.

According to a third embodiment of the invention, a circuit protecting layer is disclosed. The circuit protecting layer is formed on a to-be-protected region of a circuit in chip by a circuit protecting apparatus. In this embodiment, a circuit protecting layer 2 comprises a routing 20 consisted of a plurality of routing patterns 22. A routing starting point 201 and a routing ending point 202 of the routing 20 are located at edges of the routing patterns 22, and the routing 20 is provided with a repeater at every predetermined length interval as shown in FIG. 6. Descriptions on how the routing patterns 22 are selected and how the circuit protecting layer 20 is formed on the to-be-protected region by generating the routing 20 using the selected routing patterns 22 are discussed in the first and second embodiments, and shall be omitted here for brevity.

In this embodiment, the routing, coupled to a plurality of repeaters, receives from the circuit protecting apparatus an input signal that then passes through the repeaters to generate an output signal. In practice, the routing is coupled to a repeater at every predetermined length interval to prevent the intensity of the input signal from attenuating by repeating the input signal. Further, the repeaters increase lines in the routing to add complexity to the overall routing to lower chances of the circuit from being cracked.

The repeaters are provided at a cell layer below the circuit protecting layer, so that the routing at the circuit protecting layer extends to a cell layer through a via and coupled to a repeater and then returns to the circuit protecting layer through the via to complete the routing. This special method is also aimed at increasing obstacles against cracking. Even if a cracker successfully reaches the circuit protecting layer with the aid of FIB, since the routing at the circuit protecting layer at several points extends to the lower cell layer, it is highly unlikely that the cracker cracks such complicated routing mechanism.

When the circuit protecting apparatus receives the output signal from the routing and the output signal is decoded into a restored signal, the circuit protecting apparatus compares the restored signal with the input signal to selectively fail the chip. For example, when the comparison result indicates that the restored signal is different form the input signal, it implies that the circuit protecting layer is being cracked or destroyed, and the circuit protecting apparatus then immediately fails the chip; when the comparison result indicates that the restored chip is the same as the input signal, it means that the circuit protecting layer is secure, and the circuit protecting apparatus maintains normal operations of the chip.

Therefore, according to the circuit protecting apparatus and the associated method of the invention, a circuit protecting layer comprising a routing consisted of a plurality of random and complicated routing patterns is formed on a to-be-protected region, and routing complexity is increased using the repeaters at a cell layer below to multiply the number of lines in the routing, such that reverse engineering by FIB is made extremely difficult. Further, once the circuit protecting apparatus detects that an output signal outputted from the circuit protecting layer is different from an input signal inputted into the circuit protecting layer, it implies that the circuit protecting layer is being cracked or destroyed. At this point, to protect the to-be-protected region below the circuit protecting layer, the circuit protecting apparatus immediately fails the chip to prevent the to-be-protected region from being cracked.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A circuit protecting apparatus, applied to a predetermined region of a chip, the predetermined region comprising a plurality of minimum-sized routing regions, the circuit protecting apparatus comprising:
   a selecting module, for selecting a corresponding routing pattern from a plurality of predetermined routing patterns for each minimum-sized routing region; and
   a routing module, coupled to the selecting module, for generating a routing by utilizing the corresponding routing patterns to form a circuit protecting layer on the predetermined region; wherein the routing is coupled to a plurality of repeaters and the selecting module.

2. The circuit protecting apparatus as claimed in claim 1, further comprising:
   a processing module; and
   a control module;
   wherein the processing module is coupled to the selecting module, the routing, and the control module; the routing receives an input signal from the selecting module and generates an output signal; when the processing module decodes the output signal into a restored signal after receiving the input signal and the output signal, the processing module compares the restored signal with the input signal to generate a comparison result; and the control module selectively fails the chip according to the comparison result.

3. The circuit protecting apparatus as claimed in claim 2, wherein when the comparison result indicates the restored signal is different from the input signal, the control module fails the chip.

4. The circuit protecting apparatus as claimed in claim 2, wherein when the comparison result indicates the restored signal is same as the input signal, the control module maintains normal operations of the chip.

5. The circuit protecting apparatus as claimed in claim 1, wherein the routing is formed by the corresponding routing patterns for the minimum-sized routing regions according to a routing rule.

6. The circuit protecting apparatus as claimed in claim 1, wherein a routing starting point and a routing ending point of the routing are located at edges of each minimum-sized routing region.

7. The circuit protecting apparatus as claimed in claim 1, wherein the repeaters are a buffer, an inverter, an XOR logic gate, or an XNOR logic gate.

8. The circuit protecting apparatus as claimed in claim 1, wherein the repeaters are provided at a cell layer below the circuit protecting layer, and the routing extends to the cell layer through a via to couple to the repeaters and returns to the circuit protecting layer through the via to complete the routing.

9. The circuit protecting apparatus as claimed in claim 1, wherein the repeaters comprise fake repeaters.

10. The circuit protecting apparatus as claimed in claim 1, wherein the minimum-sized routing regions are obtained by successively dividing the predetermined region using prime factorization, routing starting points and routing ending points are determined after each division, and the selecting module selects the corresponding routing pattern for each minimum-sized routing region from the predetermined routing patterns stored in a database according to the routing starting points and the routing ending points of the minimum-sized routing regions from a last division.

11. A circuit protecting method applied to a predetermined region of a chip, comprising steps of:
    dividing the predetermined region into a plurality of minimum-sized routing regions;
    selecting a corresponding routing pattern from a plurality of predetermined routing patterns for each minimum-sized routing region; and
    generating a routing by utilizing the corresponding routing patterns to form a circuit protecting layer on the predetermined region.

12. The circuit protecting method as claimed in claim 11, further comprising steps of:
    receiving an input signal by the routing;
    generating an output signal;
    decoding the output signal into a restored signal; and
    comparing the restored signal with the input signal to selectively fail the chip.

13. The circuit protecting method as claimed in claim 12, wherein when a comparison result from the comparing step indicates the restored signal is different from the input signal, the chip is failed.

14. The circuit protecting method as claimed in claim 12, wherein when a comparison result from the comparing step indicates the restored signal is same as the input signal, normal operations of the chip are maintained.

15. The circuit protecting method as claimed in claim 11, wherein the routing is formed by the corresponding routing patterns for the minimum-sized routing regions according to a routing rule.

16. The circuit protecting method as claimed in claim 11, wherein in the dividing step, the minimum-sized routing regions are obtained by successively dividing the predetermined region using prime factorization, routing starting points and routing ending points of smaller-area regions are determined after each division, and the selecting module selects the corresponding routing pattern from the predetermined routing patterns stored in a database for each minimum-sized routing region according to the routing starting points and the routing ending points of the minimum-sized routing regions from a last division.

* * * * *